(12) United States Patent
Zhang et al.

(10) Patent No.: US 12,174,599 B2
(45) Date of Patent: Dec. 24, 2024

(54) METHOD AND SYSTEM FOR FORMULATING AN ENERGY-SAVING STRATEGY FOR SEMI-AUTOMATIC PRODUCTION LINE BASED ON MODEL PREDICTIVE CONTROL

(71) Applicant: Guangdong University of Technology, Guangzhou (CN)

(72) Inventors: Ding Zhang, Guangzhou (CN); Jiafeng Yang, Guangzhou (CN); Qiang Liu, Guangzhou (CN); Duxi Yan, Guangzhou (CN); Rongli Zhao, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/430,606

(22) Filed: Feb. 1, 2024

(65) Prior Publication Data
US 2024/0255902 A1   Aug. 1, 2024

(30) Foreign Application Priority Data
Feb. 16, 2023   (CN) .......................... 202310129750.8

(51) Int. Cl.
G05B 13/04   (2006.01)
(52) U.S. Cl.
CPC ......... *G05B 13/047* (2013.01); *G05B 13/048* (2013.01)
(58) Field of Classification Search
CPC ................................................. G05B 13/047
USPC ........................................................ 700/31
See application file for complete search history.

(56) References Cited

FOREIGN PATENT DOCUMENTS

| CN | 109426205 A  |   | 3/2019 |
| CN | 110737969 B  | * | 7/2021 |
| WO | 2016101181 A1 |  | 6/2016 |

OTHER PUBLICATIONS

Max-plus algebra based machine sleep decision for energy efficient manufacturing, By: Huang (Year: 2019).*
Event-Driven Online Machine State Decision for Energy-Effcient Manufacturing System Based on Digital Twin Using Max-Plus Algebra, By: Wang (Year: 2019).*

(Continued)

*Primary Examiner* — Jigneshkumar C Patel

(57) ABSTRACT

An energy-saving strategy formulation method for a semi-automatic production line based on model predictive control is performed as follows. max-plus algebra model is constructed, based on which an optimization objective function with the WIP products as discrete elements and sleep start moment and sleep end moment of the automated device as control variables is established. A first unoptimized WIP product is substituted into the optimization objective function, and the optimization objective function is solved to obtain an optimal sequence, in which a first set of values is output as optimization result. Whether all WIP products have been optimized is determined, and if yes, an energy-saving strategy is generated and used to control the automated device, otherwise, the optimization result is treated as disturbance information to be incorporated into the modeling. An energy-saving strategy formulation system is also provided.

6 Claims, 1 Drawing Sheet

(56) References Cited

OTHER PUBLICATIONS

Yubing Yang et al., "The Predictive Control Modeling in Computer Integrated Automation Construction", China Manufacturing Informatization (Academic Edition), Jun. 2008, vol. 37, No. 11, pp. 30-33.
Guanliang Song, "Research on Production Operation Analysis Method of Chemical Equipment Based on Time Series Data", Master degree thesis of Beijing University of Chemical Technology, May 2022, Entire document.

* cited by examiner

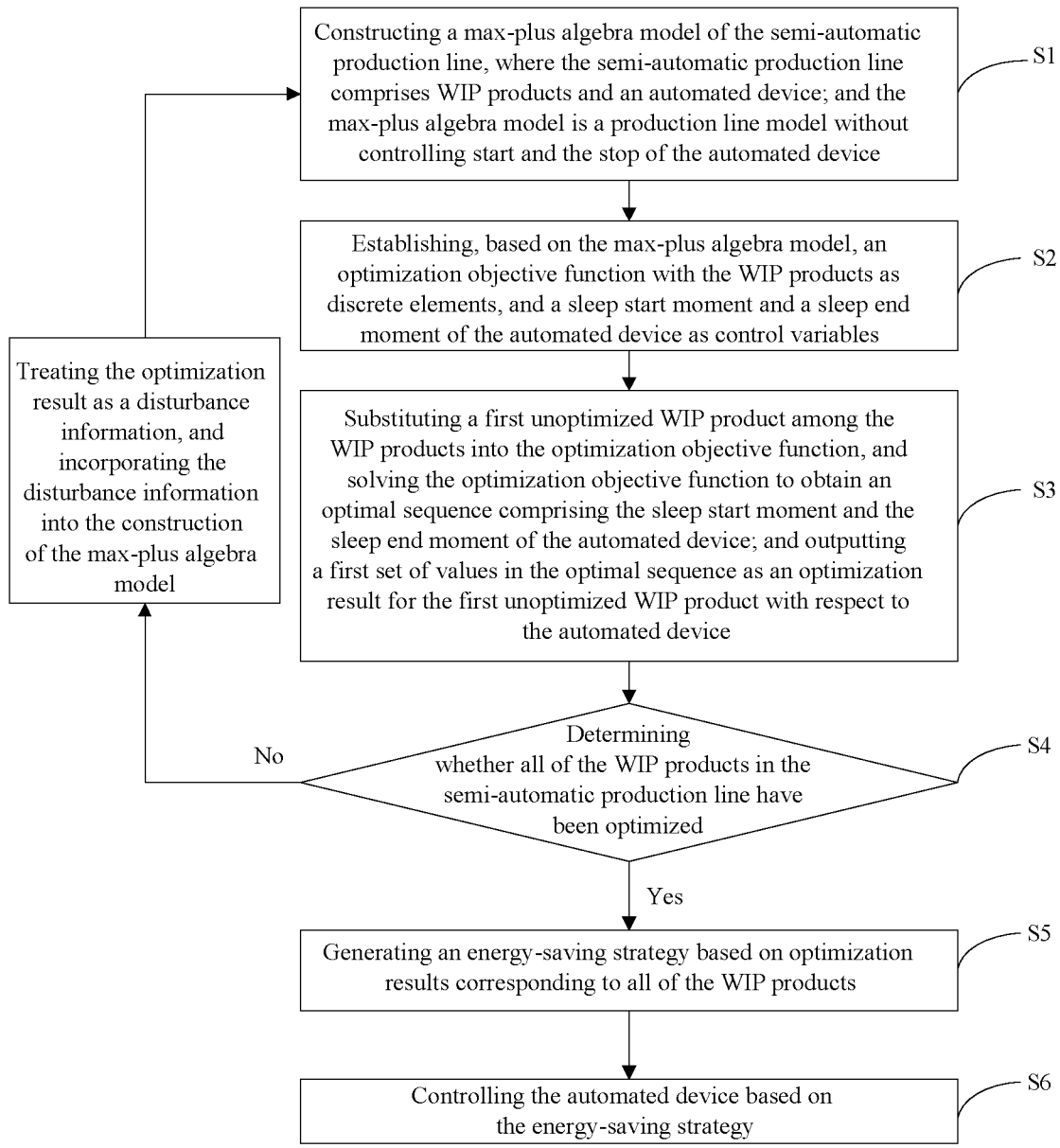

METHOD AND SYSTEM FOR FORMULATING AN ENERGY-SAVING STRATEGY FOR SEMI-AUTOMATIC PRODUCTION LINE BASED ON MODEL PREDICTIVE CONTROL

CROSS-REFERENCE TO RELATED APPLICATIONS

This application claims the benefit of priority from Chinese Patent Application No. 202310129750.8, filed on Feb. 16, 2023. The content of the aforementioned application, including any intervening amendments made thereto, is incorporated herein by reference in its entirety.

TECHNICAL FIELD

This application relates to intelligent industry technology, and more particularly to a method and system for formulating an energy-saving strategy for a semi-automatic production line based on model predictive control.

BACKGROUND

Industrial activities are generally accompanied by considerable energy consumption, and excessive energy consumption will exacerbate the carbon dioxide emission and the energy crisis. Therefore, how to efficiently complete industrial tasks with low energy consumption has attracted extensive attention. Most of the manufacturing industries focused on how to improve productivity, flexibility, and responsiveness in the past period of time, but put less attention to the energy saving and emission reduction. In view of this, many research issues arise. For example, during the operation of production systems, the automated device is not always under high-load operation, and even in an idle state in a large part of the production time. Therefore, how to effectively utilizing the idle device while coordinating the entire production line is of great significance for energy saving in the production line.

The common energy-saving strategy in the current industrial production is based on event-driven approaches. During the operation of production lines, events such as starvation, blockage, faults, and fault recovery often occur on the device, and energy-saving decisions are triggered based on these events according to the event-driven method. Once the energy-saving decisions have been triggered, a corresponding processing mechanism is selected according to the specific event to control the start and stop of the device. The hibernation duration of the device depends on the energy-saving time window, which is the maximum duration under which the device hibernation does not cause production losses. This method can significantly reduce the burden of data collection, adapt to the system randomness, and achieve certain energy-saving effects. However, the event-driven methods also have certain limitations. For mature production systems, there may not be many random events or events triggering energy-saving decisions, resulting in less effective energy-saving outcomes. Additionally, the ultimate goal of event-driven methods is not to formulate the optimal energy-saving strategy, which makes the resultant energy-saving strategy fail to maximally optimize the production control. In summary, the prior art struggles with unsatisfactory stability, and fails to achieve the optimal energy-saving results.

SUMMARY

The present disclosure provides a method and system for formulating an energy-saving strategy for a semi-automatic production line based on model predictive control to address the limitations and low effectiveness in the existing energy-saving strategy formulating methods.

Firstly, the present disclosure provides an energy-saving strategy formulation method for a semi-automatic production line based on model predictive control, comprising:

(S1) constructing a max-plus algebra model of the semi-automatic production line, wherein the semi-automatic production line comprises work-in-process (WIP) products and an automated device; and the max-plus algebra model is a production line model without controlling start and the stop of the automated device;

(S2) establishing, based on the max-plus algebra model, an optimization objective function with the WIP products as discrete elements, and a sleep start moment and a sleep end moment of the automated device as control variables;

(S3) substituting a first unoptimized WIP product among the WIP products into the optimization objective function, and solving the optimization objective function to obtain an optimal sequence comprising the sleep start moment and the sleep end moment of the automated device; and outputting a first set of values in the optimal sequence as an optimization result for the first unoptimized WIP product with respect to the automated device;

(S4) determining whether all of the WIP products in the semi-automatic production line have been optimized, if yes, proceeding to step (S5); otherwise, treating the optimization result as a disturbance information, and returning to step (S1) to incorporate the disturbance information into the construction of the max-plus algebra model;

(S5) generating an energy-saving strategy based on optimization results corresponding to all of the WIP products; and;

(S6) controlling the automated device based on the energy-saving strategy. Further, in step (S2), the optimization objective function satisfies the following formulas (1) to (4):

$$\min J = K_1 \cdot J_1 + K_2 \cdot J_2; \tag{1}$$

$$J_1 = \sum_{i=1}^{N_p} [T_l(k+i) - T_s(k+i \mid k)]; \tag{2}$$

$$J_2 = -\sum_{i=1}^{N_p} \sum_{s=1}^{M} \{u_{k+i}^s - [x_s(k+i-1 \mid k) + p_s(k+i-1)]\}; \tag{3}$$

$$\text{and } K_1 > K_2; \tag{4}$$

wherein k indicates that it is currently a $k^{th}$ round of optimization, $N_p$ is a length of a prediction horizon of the optimization objective function, $T_l(k+i)$ is an output rate of a $(k+i)^{th}$ WIP product, $T_s(k+i|k)$ is an output rate of the $(k+i)^{th}$ WIP product when an information of a $k^{th}$ WIP product is known, M is the number of the automated device, $u_{k+i}^s$ is a sleep end moment of an $s^{th}$ automated device when processing the $(k+i)^{th}$ WIP product, $x_s(k+i-1|k)$ is a moment when the $s^{th}$ automated device starts to process a $(k+i-1)^{th}$ WIP product, $p_s(k+i-1)$ is a time required for the $s^{th}$ automated device to process the $(k+i-1)^{th}$ WIP product, and $[x_s(k+i-1|k)+p_s(k+i-1)]$ is a moment when the $s^{th}$ automated device finishes processing the $(k+i-1)^{th}$ WIP product, $K_1$ is a first weighting factor, and $K_2$ is a second weighting factor.

Further, step (S2) further comprises: setting a constraint for the optimization objective function, wherein the constraint satisfies the following formulas (5) to (7):

$$u_{min} < u^s_{k+i} \le u_{max}; \quad (5)$$

$$u_{min} = x_s(k+i-1 \mid k) + p_s(k+i-1); \quad (6)$$

$$\text{and } u_{max} = x_s(k+i-1 \mid k) + p_s(k+i-1) + VTW(s); \quad (7)$$

wherein $u_{min}$ is a lower bound of the sleep end moment of the $s^{th}$ automated device when processing the $(k+i)^{th}$ WIP product, $u_{max}$ is an upper bound of the sleep end moment of the $s^{th}$ automated device when processing the $(k+i)^{th}$ WIP product, and $VTW(s)$ is a time window of the $s^{th}$ automated device.

Further, step (S5) comprises the following sub-steps:

(S51) obtaining the optimization results corresponding to the WIP products according to the optimal sequence, and setting an initial sleep time based on difference between an optimization result corresponding to a current WIP product and the sleep start moment; and setting a critical value $t_c$;

(S52) determining whether the initial sleep time is less than or equal to the critical value, if yes, keeping the automated device in an awake state, otherwise, setting a sleep time for the automated device, and putting the automated device in a sleep state for the sleep time;

(S53) taking the awake state or the sleep state of the automated device corresponding to the current WIP product as the energy-saving strategy;

(S54) determining whether energy-saving strategies of all the WIP products have been formulated, if yes, proceeding to step (S55); otherwise, returning to step (S51); and (S55) outputting the energy-saving strategies of all the WIP products.

Further, in step (S52), if the initial sleep time is less than or equal to the critical value and the automated device is kept in the awake state, the initial sleep time is set to zero.

Further, in step (S52), if the initial sleep time is greater than the critical value and the automated device enters the sleep state, a value of the sleep time is set to $$\{u^s_{k+i} - [x_s(k+i-1 \mid k) + p_s(k+i-1)]\}.$$

Secondly, the embodiment of the present disclosure provides an energy-saving strategy formulation system for a semi-automatic production line based on model predictive control, comprising:

an algebra modeling module;
an optimization module;
a solution module;
an iteration module;
a strategy generation module; and
a strategy execution module;

wherein the algebra modeling module is configured for modeling the semi-automatic production line utilizing a max-plus algebra method to obtain a max-plus algebra model of the semi-automatic production line, wherein the semi-automatic production line comprises WIP products and an automated device; and the max-plus algebra model is a production line model without controlling start and stop of the automated device;

the optimization module is configured for establishing an optimization objective function with the WIP products as discrete elements, and a sleep start moment and a sleep end moment of the automated device as control variables based on the max-plus algebra model;

the solution module is configured for substituting a first unoptimized WIP product among the WIP products into the optimization objective function, solving the optimization objective function to obtain an optimal sequence comprising the sleep start moment and the sleep end moment of the automated device, and outputting a first set of values in the optimal sequence as an optimization result for the first unoptimized WIP product with respect to the automated device;

the iteration module is configured for performing functions of:

determining whether all of the WIP products in the semi-automatic production line have been optimized; and if yes, proceeding to step (S5);

if not, treating the optimization result as a disturbance information, returning to step (S1), and incorporating the disturbance information into the modeling of the semi-automatic production line;

the strategy generation module is configured for generating an energy-saving strategy based on optimization results corresponding to all of the WIP products in the case that all of the WIP products in the semi-automatic production line have been optimized; and the strategy execution module is configured for controlling the automated device based on the energy-saving strategy.

The beneficial effects of the present disclosure are described as follows.

In this application, the max-plus algebra model of the production line is used as the base model, and the optimization problem is established by model-based predictive control (MPC), rolling optimization, and feedback correction, and solved to obtain the optimal energy-saving strategies. Compared to the prior art, the method proposed by the present disclosure exhibits better stability, stronger anti-interference performance, and improved robustness. Additionally, it facilitates the diversification of energy-saving methods in the manufacturing industry.

BRIEF DESCRIPTION OF THE DRAWINGS

FIG. 1 is a flow chart of an energy-saving strategy formulation method for a semi-automatic production line based on model predictive control according to an embodiment of the present disclosure.

DETAILED DESCRIPTION OF EMBODIMENTS

In order to make the purpose, technical solutions, and advantages of the present disclosure clearer, the present disclosure will be further described in detail below with reference to the accompanying drawings and embodiments. It should be understood that the specific embodiments described here are only used to illustrate the present disclosure and are not intended to limit the present disclosure.

Referring to an embodiment shown in FIG. 1, an energy-saving strategy formulation method for a semi-automatic production line based on model predictive control is provided, integrating model-based predictive control (MPC), rolling optimization, and feedback correction. The method includes the following steps.

(S1) A max-plus algebra model of the semi-automatic production line is constructed, where the semi-automatic production line includes work-in-process (WIP) products and an automated device; and the max-plus algebra model is a production line model without controlling start and the stop of the automated device.

The max-plus algebra method is utilized to establish an initial production-line model (max-plus algebra model), and the initial production-line model does not control the start and stop of the automated devices. In this state, the production line can output finished products according to predetermined time intervals, but the energy consumption of the production line is maximized due to no energy-saving strategies in place. Therefore, modeling the production line without any energy-saving strategies helps to avoid interference from existing strategies.

(S2) Based on the max-plus algebra model, an optimization objective function is established with the WIP products as discrete elements, and a sleep start moment and a sleep end moment of the automated device as control variables.

In an embodiment of the present disclosure, each WIP product in the production system is treated as a discrete element, with all the automated devices on the production line as control objects. The duration of each sleep period of the device during the production line operation should be determined by two variables: the sleep start moment and the sleep end moment of the automated device. In order to maximize the sleep time without affecting the output and save the most energy, the sleep start moment on each automated device is defaulted to the time when the previous WIP product is completed processing. Therefore, in the embodiments of the present disclosure, the sleep end moment for automated device is considered as the decision variable in the optimization problem, and the number of the decision variables in each optimization round is determined by the number of automated devices on the production line and the length of the prediction horizon of MPC.

In an embodiment, in step (S2), the optimization objective function satisfies the following formulas (1)-(4):

$$\min J = K_1 \cdot J_1 + K_2 \cdot J_2; \tag{1}$$

$$J_1 = \sum_{i=1}^{N_p} [T_f(k+i) - T_s(k+i\,|\,k)]; \tag{2}$$

$$J_2 = -\sum_{i=1}^{N_p} \sum_{s=1}^{M} \{u_{k+i}^s - [x_s(k+i-1\,|\,k) + p_s(k+i-1)]\}; \tag{3}$$

$$\text{and } K_1 > K_2; \tag{4}$$

In the above formulas, k indicates that it is currently a $k^{th}$ round of optimization, $N_p$ is a length of a prediction horizon of the optimization objective function, $T_f(k+i)$ is an output rate of a $(k+i)^{th}$ WIP product, $T_s(k+i|k)$ is an output rate of the $(k+i)^{th}$ WIP product when an information of a $k^{th}$ WIP product is known, M is the number of the automated device, $u_{k+i}^s$ is a sleep end moment of an $s^{th}$ automated device when processing the $(k+i)^{th}$ WIP product, $x_s(k+i-1|k)$ is a moment when the $s^{th}$ automated device starts to process a $(k+i-1)^{th}$ WIP product, $p_s(k+i-1)$ is a time required for the $s^{th}$ automated device to process the $(k+i-1)^{th}$ WIP product, $[x_s(k+i-1|k)+p_s(k+i-1)]$ is a moment when the $s^{th}$ automated device finishes processing the $(k+i-1)^{th}$ WIP product, $K_1$ is a first weighting factor, and $K_2$ is a second weighting factor.

In an embodiment, Equation (2) is used to minimize the negative impact of the formulated energy-saving strategy on production capacity. Specifically, the difference between the output rate of WIP products within the prediction horizon before and after the implementation of the strategy is used as the calculation objective for Equation (2). The larger the difference, the slower the output of WIP products due to the energy-saving strategy, and the greater the negative impact on the production line. Therefore, a smaller value of the difference is preferable for this objective.

In an embodiment, Equation (3) is used to maximize energy savings in the system. Specifically, energy savings are quantified by calculating the sleep time of the device. The amount of energy saved is related to the length of the sleep time of the device. The longer the sleep time of a piece of device, the more energy it saves. Therefore, a larger value is preferable for this objective.

In an embodiment, Equation (4) is aimed at achieving energy savings without causing significant negative impacts on production capacity according to the actual production needs. Therefore, weighting factors are used to control the impact of the strategy on production.

To ensure the sleep end moment for the device to be more reasonable, appropriate constraints must be added to the decision variables. In an embodiment, two special cases for semi-automatic production lines are considered. In one case, the device does not need to enter sleep mode, that is, the sleep time is 0, and the sleep end moment should be equal to the sleep start moment. In another case, there is only one automated device on the entire production line, the sleep time of the device should equal the value of its disturbance time window. This is because when the downtime of the device is less than or equal to the value of the time window, there is no production loss on the production line. In this case, the sleep end moment for the device should equal the sleep start moment plus the value of the disturbance time window of the device.

In an embodiment, in step (S2), a constraint is set for the optimization objective function and the constraint satisfies the following formulas (5) to (7):

$$u_{min} < u_{k+i}^s \le u_{max}; \tag{5}$$

$$u_{min} = x_s(k+i-1\,|\,k) + p_s(k+i-1); \tag{6}$$

$$\text{and } u_{max} = x_s(k+i-1\,|\,k) + p_s(k+i-1) + VTW(s); \tag{7}$$

In the above formulas, $u_{min}$ is a lower bound of the sleep end moment of the $s^{th}$ automated device when processing the $(k+i)^{th}$ WIP product, $u_{max}$ is an upper bound of the sleep end moment of the $s^{th}$ automated device when processing the $(k+i)^{th}$ WIP product, and VTW(s) is a time window of the $s^{th}$ automated device.

(S3) A first unoptimized WIP product among the WIP products is substituted into the optimization objective function and the optimization objective function is solved to obtain an optimal sequence including the sleep start moment and the sleep end moment of the automated device; and outputting a first set of values in the optimal sequence as an optimization result for the first unoptimized WIP product with respect to the automated device.

(S4) Whether all of the WIP products in the semi-automatic production line have been optimized is determined. If yes, step (S5) is performed; otherwise, the optimization result is treated as a disturbance information, and incorporated into the construction of the max-plus algebra model in step (S1).

In an embodiment, based on MPC, the optimization problem for the current WIP products is solved to yield the optimal sequence within the prediction horizon. The first set of values within the optimal sequence, which represents the sleep end moment for each WIP product on the respective automated device within the prediction horizon, is outputted as the final result of this optimization round. Subsequently, this result is treated as disturbance information, which is incorporated when remodeling the state space of the production line using max-plus algebra to update the production line model. In the next optimization round, the starting point of the prediction horizon shifts to the next WIP product, and the above steps are repeated based on the updated production line model until all WIP products are completed optimization.

(S5) An energy-saving strategy is generated based on optimization results corresponding to all of the WIP products.

In an embodiment, step (S5) includes the following substeps.

(S51) The optimization results corresponding to the WIP products according to the optimal sequence are obtained, and an initial sleep time is set based on difference between an optimization result corresponding to a current WIP product and the sleep start moment; and a critical value $t_c$ is set.

In the embodiment, when the calculated sleep time equals the critical value, the energy saved by the device through sleep equals the sum of the energy consumed by the device from run to sleep and the energy consumed by the device from sleep to run.

(S52) Whether the initial sleep time is less than or equal to the critical value is determined. If yes, the automated device is kept in an awake state; otherwise, a sleep time for the automated device is set, and the automated device is put in a sleep state for the sleep time.

(S53) The awake state or the sleep state of the automated device corresponding to the current WIP product is taken as the energy-saving strategy.

(S54) Whether energy-saving strategies of all the WIP products have been formulated is determined. If yes, step (S55) is performed; otherwise, step (S51) is performed.

(S55) The energy-saving strategies of all the WIP products are outputted.

The above steps determine whether each automated device needs to enter sleep mode and how long the sleep time during each processing, thereby forming an energy-saving strategy.

In an embodiment, in step (S52), if the initial sleep time is less than or equal to the critical value and the automated device is kept in the awake state, the initial sleep time is set to zero. In this case, $u_{k+i}^s$ is less than or equal to $[x_s(k+i-1|k)+p_s(k+i-1)+t_c]$.

In an embodiment, in step (S52), if the initial sleep time is greater than the critical value and the automated device enters the sleep state, a value of the sleep time is set to $\{u_{k+i}^s-[x_s(k+i-1|k)+p_s(k+i-1)]\}$. In this case, $u_{k+i}^s$ is greater than $$[x_s(k+i-1 \mid k) + p_s(k+i-1) + t_c].$$

(S6) The automated device is controlled based on the energy-saving strategy.

The beneficial effects of the present disclosure are described as follows. The max-plus algebra model of the production line is used as the base model, and the optimization problem is established by model-based predictive control (MPC), rolling optimization, and feedback correction, and solved to obtain the optimal energy-saving strategies. Compared to the prior art, the method proposed by the present disclosure exhibits better stability, stronger anti-interference performance, and improved robustness. Additionally, it facilitates the diversification of energy-saving methods in the manufacturing industry.

An embodiment of the present disclosure further provides an energy-saving strategy formulation system for a semi-automatic production line based on model predictive control, including an algebra modeling module.

The algebra modeling module is configured for constructing a max-plus algebra model of the semi-automatic production line, where the semi-automatic production line includes WIP products and an automated device; and the max-plus algebra model is a production line model without controlling start and stop of the automated device.

The optimization module is configured for establishing an optimization objective function with the WIP products as discrete elements, and a sleep start moment and a sleep end moment of the automated device as control variables based on the max-plus algebra model.

The solution module is configured for substituting a first unoptimized WIP product among the WIP products into the optimization objective function, solving the optimization objective function to obtain an optimal sequence including the sleep start moment and the sleep end moment of the automated device, and outputting a first set of values in the optimal sequence as an optimization result for the first unoptimized WIP product with respect to the automated device.

The iteration module is configured for performing functions of: determining whether all of the WIP products in the semi-automatic production line have been optimized; and if not, treating the optimization result as a disturbance information, returning to step (S1), and incorporating the disturbance information into the construction of the max-plus algebra model of the semi-automatic production line.

The strategy generation module is configured for generating an energy-saving strategy based on optimization results corresponding to all of the WIP products in the case that all of the WIP products in the semi-automatic production line have been optimized.

The strategy execution module is configured for controlling the automated device based on the energy-saving strategy.

The energy-saving strategy formulation system provided herein can implement the steps of the energy-saving strategy formulation method in the above embodiments, and can achieve the same technical effects as described in the above embodiments. The description is not repeated here for brevity.

Those skilled in the art can understand and implement all or part of the process in the above embodiments. This process can be implemented by instructing relevant hardware by computer programs. The programs can be stored in a computer-readable storage medium, e.g., magnetic disks, optical disks, read-only memory (ROM), and random access memory (RAM). The program can be executed to implement the process described in the above embodiments.

It should be noted that in the present disclosure, the terms "including", "comprising" or any other variations thereof are intended to encompass non-exclusive inclusion, so that processes, methods, items, or devices including a series of elements include not only those elements explicitly listed but also any other elements not explicitly listed, or those elements inherently included in such processes, methods, items, or devices. Without further limitation, the element specified by the phrase "comprising a . . . " do not exclude the presence of additional identical elements in processes, methods, items, or devices that include the specified element.

Through the description of the above embodiments, those skilled in the art can clearly understand that the above embodiments can be implemented through software with the necessary general hardware platforms. Hardware is also feasible, but in many cases, the former is a preferable implementation method. Based on this, the technical solutions of the present disclosure, or the part that contributes to the prior art, can essentially be embodied in the form of a software product. This computer software product is stored in a storage medium (such as ROM/RAM, disk, or optical disk), and includes several instructions to enable a terminal (e.g., mobile phone, computer, server, air conditioner, or network device) to execute the methods described in various embodiments of the present disclosure.

The present disclosure has been described in detail above with reference to accompanying drawings and embodiments. It should be noted that the disclosed embodiments are merely exemplary, and are not intended to limit the present disclosure. Those skilled in the art can still make various changes, modifications and replacements to technical features recited in the above embodiments. It should be understood that those changes, modifications and replacements made without departing from the spirit of the disclosure shall fall within the scope of the disclosure defined by the appended claims.

What is claimed is:

1. An energy-saving strategy formulation method for a semi-automatic production line based on model predictive control, comprising:
   (S1) constructing a max-plus algebra model of the semi-automatic production line, wherein the semi-automatic production line comprises work-in-process (WIP) products and an automated device; and the max-plus algebra model is a production line model without controlling start and the stop of the automated device;
   (S2) establishing, based on the max-plus algebra model, an optimization objective function with the WIP products as discrete elements, and a sleep start moment and a sleep end moment of the automated device as control variables;
   (S3) substituting a first unoptimized WIP product among the WIP products into the optimization objective function, and solving the optimization objective function to obtain an optimal sequence comprising the sleep start moment and the sleep end moment of the automated device; and outputting a first set of values in the optimal sequence as an optimization result for the first unoptimized WIP product with respect to the automated device;
   (S4) determining whether all of the WIP products in the semi-automatic production line have been optimized, if yes, proceeding to step (S5); otherwise, treating the optimization result as a disturbance information, and returning to step (S1) to incorporate the disturbance information into the construction of the max-plus algebra model;
   (S5) generating an energy-saving strategy based on optimization results corresponding to all of the WIP products; and
   (S6) controlling the automated device based on the energy-saving strategy.

2. The energy-saving strategy formulation method of claim 1, wherein in step (S2), the optimization objective function satisfies the following formulas (1) to (4):

$$\min J = K_1 \cdot J_1 + K_2 \cdot J_2; \quad (1)$$

$$J_1 = \sum_{i=1}^{N_p}[T_l(k+i) - T_s(k+i\mid k)]; \quad (2)$$

$$J_2 = -\sum_{i=1}^{N_p}\sum_{s=1}^{M}\{u_{k+i}^s - [x_s(k+i-1\mid k) + p_s(k+i-1)]\}; \quad (3)$$

$$\text{and } K_1 > K_2; \quad (4)$$

wherein k indicates that it is currently a $k^{th}$ round of optimization, $N_p$ is a length of a prediction horizon of the optimization objective function, $T_l(k+i)$ is an output rate of a $(k+i)^{th}$ WIP product, $T_s(k+i\mid k)$ is an output rate of the $(k+i)^{th}$ WIP product when an information of a $k^{th}$ WIP product is known, M is the number of the automated device, $u_{k+i}^s$ is a sleep end moment of an $s^{th}$ automated device when processing the $(k+i)^{th}$ WIP product, $x_s(k+i-1\mid k)$ is a moment when the $s^{th}$ automated device starts to process a $(k+i-1)^{th}$ WIP product, $p_s(k+i-1)$ is a time required for the $s^{th}$ automated device to process the $(k+i-1)^{th}$ WIP product, $[x_s(k+i-1\mid k)+p_s(k+i-1)]$ is a moment when the $s^{th}$ automated device finishes processing the $(k+i-1)^{th}$ WIP product, $K_1$ is a first weighting factor, and $K_2$ is a second weighting factor.

3. The energy-saving strategy formulation method of claim 2, wherein step (S2) further comprises:
   setting a constraint for the optimization objective function, wherein the constraint satisfies the following formulas (5) to (7):

$$u_{min} < u_{k+i}^s \le u_{max}; \quad (5)$$

$$u_{min} = x_s(k+i-1\mid k) + p_s(k+i-1); \quad (6)$$

$$\text{and } u_{max} = x_s(k+i-1\mid k) + p_s(k+i-1) + VTW(s); \quad (7)$$

wherein $u_{min}$ is a lower bound of the sleep end moment of the $s^{th}$ automated device when processing the $(k+i)^{th}$ WIP product, $u_{max}$ is an upper bound of the sleep end moment of the $s^{th}$ automated device when processing the $(k+i)^{th}$ WIP product, and VTW(s) is a time window of the $s^{th}$ automated device.

4. The energy-saving strategy formulation method of claim 2, wherein step (S5) comprises the following substeps:
   (S51) obtaining the optimization results corresponding to the WIP products according to the optimal sequence, and setting an initial sleep time based on difference between an optimization result corresponding to a current WIP product and the sleep start moment; and setting a critical value $t_c$;
   (S52) determining whether the initial sleep time is less than or equal to the critical value, if yes, keeping the automated device in an awake state, otherwise, setting a sleep time for the automated device, and putting the automated device in a sleep state for the sleep time;
   (S53) taking the awake state or the sleep state of the automated device corresponding to the current WIP product as the energy-saving strategy;

(S54) determining whether energy-saving strategies of all the WIP products have been formulated, if yes, proceeding to step (S55); otherwise, returning to step (S51); and (S55) outputting the energy-saving strategies of all the WIP products.

5. The energy-saving strategy formulation method of claim 4, wherein in step (S52), if the initial sleep time is less than or equal to the critical value and the automated device is kept in the awake state, the initial sleep time is set to zero.

6. The energy-saving strategy formulation method of claim 4, wherein in step (S52), if the initial sleep time is greater than the critical value and the automated device enters the sleep state, a value of the sleep time is set to $\{u_{k+i}^s - [x_s(k+i-1|k) + p_s(k+i-1)]\}$.

* * * * *